May 5, 1925.

G. E. CARTER

CASTELLATED NUT

Filed March 2, 1921

1,536,767

WITNESSES:
O. H. Dunton
Leroy Hill

INVENTOR.
G. E. Carter

Patented May 5, 1925.

1,536,767

UNITED STATES PATENT OFFICE.

GEORGE E. CARTER, OF CIRCLEVILLE, OHIO, ASSIGNOR TO THE EASTERN ENGINEERING CORPORATION, OF COLUMBUS, OHIO, A CORPORATION OF DELAWARE.

CASTELLATED NUT.

Application filed March 2, 1921. Serial No. 449,059.

*To all whom it may concern:*

Be it known that I, GEORGE EDWARD CARTER, a citizen of the United States, and residing at Circleville, in the county of Pickaway and State of Ohio, have invented certain new and useful Improvements in Castellated Nuts; and I do hereby declare the following to be a full, clear, and exact description of the invention, such as will enable others skilled in the art to which it appertains to make and use the same.

This invention relates to improvements in castellated nuts, and the object of the invention is to provide a castellated nut that is expedient to manipulate and that is cheap to manufacture.

By reference to the accompanying drawings, which form a part of the specifications, in which drawings, like characters of reference indicate like parts thruout the views, and in which—

In the form of the invention, I have shown a divergence in my form of slot from the usual form of slot employed at present in castellated nuts.

Figure 1:
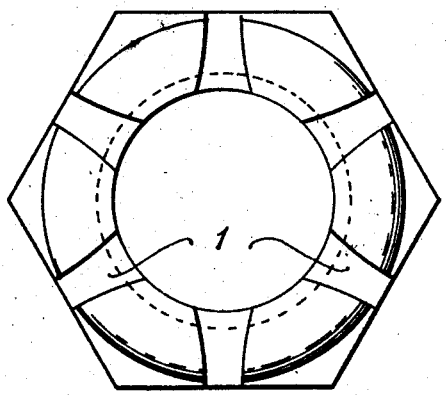
Fig. 1 is a plan showing the slot walls 1 diverging inwardly.

In Fig. 1 I have shown the form of the slots 1 as having their side walls diverging inwardly on the arc of a circle. This form of slot greatly facilitates the inserting of cotter pins.

Figure 2:
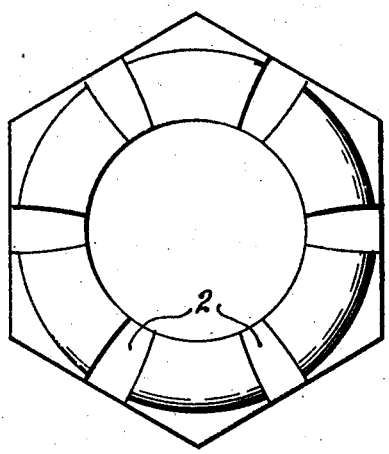
Fig. 2 is a plan showing the slot walls 2 diverging outwardly.
Figure 3:
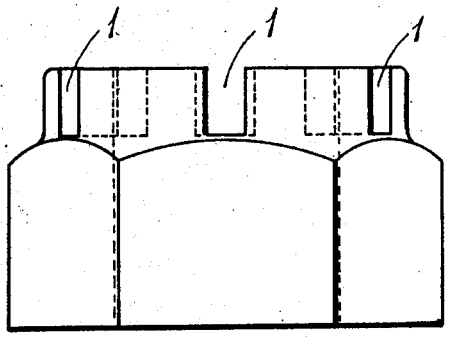
Fig. 3 is an elevation of Fig. 1.

In Fig. 2 I have shown the slots 2 as having their side walls diverging outwardly on the arc of a circle. This form of slot also greatly facilitates the inserting of cotter pins.

Figure 4:
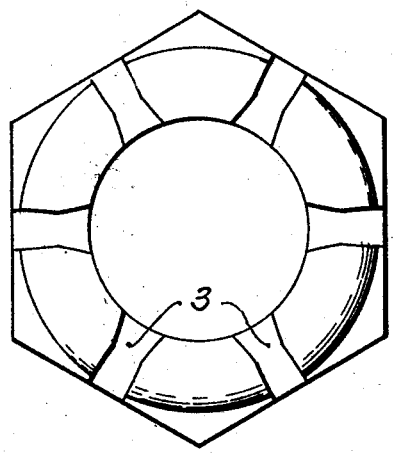
Fig. 4 is a plan showing the slot walls 3 diverging inwardly and outwardly.

In Fig. 4 I have shown the slot walls 3 converging inwardly and outwardly to a point within the castellated portion of the nut wall.

The slots referred to can be conveniently and rapidly cut by the device and according to the method described in the Letters Patent of the United States No. 1,498,231, dated June 17, 1924. In that patent it will be observed that the axis of the cutting tool turns upon an axis parallel to the axis of the nut.

It is obvious that I do not intend to confine myself strictly to having the side walls of the slots curved and diverge inwardly or outwardly, but I claim the right to vary these side walls with reference to radial lines or axes so long as the side walls diverge inwardly or outwardly, or so long as they diverge inwardly and outwardly.

I claim:

1. A castellated nut having a side of its slot wall formed on the arc of a circle, the axis of which is substantially parallel to the axis of the nut.

2. A castellated nut having the opposite sides of its slot walls formed on the arcs of circles the axes of which are substantially parallel to the axis of the nut.

3. A castellated nut having sides of its slot walls formed on the arcs of circles the axes of which are substantially parallel to the axis of the nut said slots flaring at their ends.

4. A castellated nut having a side of its slot wall formed on the arc of a circle the axis of which is substantially parallel to the axis of the nut said slot flaring at one end.

5. A castellated nut having a crest formed with notches having a desired portion to snugly engage a cotter pin and expandingly tapered portions terminating on the inside and outside of the nut.

In testimony whereof I affix my signature in the presence of two witnesses.

GEORGE E. CARTER.

Witnesses:
Jos. W. ADKINS,
MARY FORESMAIR.